(12) United States Patent
Fujinami et al.

(10) Patent No.: US 8,822,086 B2
(45) Date of Patent: Sep. 2, 2014

(54) SOLVENT FOR ELECTROLYTE SOLUTION, ELECTROLYTE SOLUTION, AND GEL-LIKE ELECTROLYTE

(75) Inventors: Tatsuo Fujinami, Hamamatsu (JP); Yasutaka Tanaka, Hamamatsu (JP); Yasutoshi Iriyama, Hamamatsu (JP)

(73) Assignee: National University Corporation Shizuoka University, Shizuoka-shi (JP)

( * ) Notice: Subject to any disclaimer, the term of this patent is extended or adjusted under 35 U.S.C. 154(b) by 401 days.

(21) Appl. No.: 13/498,422

(22) PCT Filed: Sep. 28, 2010

(86) PCT No.: PCT/JP2010/066853
§ 371 (c)(1),
(2), (4) Date: Apr. 17, 2012

(87) PCT Pub. No.: WO2011/037263
PCT Pub. Date: Mar. 31, 2011

(65) Prior Publication Data
US 2012/0196187 A1    Aug. 2, 2012

(30) Foreign Application Priority Data

Sep. 28, 2009   (JP) ................................. 2009-223373

(51) Int. Cl.
| | | |
|---|---|---|
| *H01M 10/40* | (2006.01) | |
| *H01M 10/0569* | (2010.01) | |
| *H01M 10/052* | (2010.01) | |
| *H01M 10/0565* | (2010.01) | |
| *H01M 10/0568* | (2010.01) | |

(52) U.S. Cl.
CPC .. *H01M 10/0565* (2013.01); *H01M 2300/0037* (2013.01); *H01M 10/0569* (2013.01); *H01M 10/052* (2013.01); *Y02E 60/122* (2013.01); *Y02T 10/7011* (2013.01); *H01M 10/0568* (2013.01)
USPC ............................ 429/339; 429/324; 429/341

(58) Field of Classification Search
None
See application file for complete search history.

(56) References Cited

U.S. PATENT DOCUMENTS

| 2,927,125 | A | * | 3/1960 | Martinek et al. ............... 558/294 |
| 6,022,643 | A | * | 2/2000 | Lee et al. ....................... 429/324 |

(Continued)

FOREIGN PATENT DOCUMENTS

| JP | 2000100469 A | 4/2000 |
| JP | 2002334717 A | 11/2002 |

(Continued)

OTHER PUBLICATIONS

First Office Action for Chinese Application No. 201080043358.2, dated Dec. 19, 2013.

(Continued)

*Primary Examiner* — Ula C Ruddock
*Assistant Examiner* — Tony Chuo
(74) *Attorney, Agent, or Firm* — Marshall, Gerstein & Borun LLP (57) ABSTRACT

The invention provides a solvent for an electrolyte solution, an electrolyte solution, and a gel-like electrolyte superior in oxidation resistance and flame resistance. A solvent for an electrolyte solution comprising at least one boric ester represented by the following formula (I), and a boric ester represented by the following formula (II): $B(OR_f)_3$ (I); $B(OCH_2CH_2CN)_3$ (II) wherein, in formula (I), each $R_f$ independently represents $CH_2(CF_2)nCF_3$ or $CH(CF_3)_2$, n is an integer from 0 to 6, and at least a part of each of —ORf and —$OCH_2CH_2CN$ included in the boric esters is transesterified.

14 Claims, 10 Drawing Sheets

(56) References Cited

U.S. PATENT DOCUMENTS

| | | |
|---|---|---|
| 6,322,930 B1 | 11/2001 | Yoshimura et al. |
| 6,833,220 B1 | 12/2004 | Yokoyama et al. |
| 2004/0266981 A1 | 12/2004 | Yokoyama et al. |

FOREIGN PATENT DOCUMENTS

| | | | |
|---|---|---|---|
| JP | 2003132946 A | 5/2003 |
| JP | 2003317800 A | 11/2003 |
| JP | 2004002342 A | 1/2004 |
| JP | 2008300125 A | 12/2008 |

OTHER PUBLICATIONS

International Search Report for PCT/JP2010/066853 dated Dec. 14, 2010.

* cited by examiner

A: 1
B: 1 + LiPF$_6$ (10 : 1 molar ratio)
C: 1 + LiPF$_6$ (3 : 1 molar ratio)
D: 1 + LiPF$_6$ (1 : 1 molar ratio)
E: 1 + LiPF$_6$ (1 : 2 molar ratio)

SOLVENT FOR ELECTROLYTE SOLUTION, ELECTROLYTE SOLUTION, AND GEL-LIKE ELECTROLYTE

TECHNICAL FIELD

The present invention relates to a solvent for an electrolyte solution, an electrolyte solution, and a gel-like electrolyte.

BACKGROUND ART

A lithium secondary battery has been broadly used as a power source for a portable electronic device, such as a notebook computer and a cell phone, owing to its high discharge voltage and energy density. Further, development thereof as a power source for a hybrid electric vehicle, a plug-in hybrid electric vehicle, and an electric vehicle car is under way. The key issue is extension of the mileage per battery charge of a plug-in hybrid electric vehicle or an electric vehicle, and also for an HEV (hybrid electric vehicle) weight reduction and output increase of a storage battery has been demanded.

There are two possibilities for increasing the energy density (Wh/Kg=VAh/Kg) of an onboard lithium battery, namely to increase the capacity (Ah/Kg) of an electrode active material and to increase the discharge voltage (V), and it has been desired to realize the two. While, in a lithium cobalt oxide positive electrode currently used, only about a half of lithium is utilized by charging a battery at 4.2 V, and therefore if the utilization factor of the lithium ion can be enhanced by increasing the potential, the energy density can be improved.

Although heretofore an electrolyte for a lithium ion secondary battery has been constituted of a liquid electrolyte in which a lithium salt is dissolved in an aprotic organic solvent, or a gel polymer electrolyte impregnating the same into a porous structural material such as PVDF-HFP (porous polyvinylidene fluoride-hexafluoropropylene), the use of a flammable organic solvent has more serious safety problem, when a battery scale increases, and therefore a nonflammable or flame retardant electrolyte solution has been demanded.

For example, an inorganic solid electrolyte is a highly safe fireproof electrolyte. An oxide type and a sulfide type material having high ionic conductivity (order of magnitude of 10-3 S/cm) and electrochemical stability have been reported. However, since they are inorganic materials, they are brittle and formation of a cell is difficult. There is another drawback of poor contact between an electrode and an electrolyte.

The polymer electrolyte can be classified to a pure polymer electrolyte (hereinafter written as "polymer electrolyte") and a gel electrolyte.

A polymer electrolyte is an electrolyte in which a lithium salt is dissolved in a host polymer such as polyethylene oxide. Since a battery using a polymer electrolyte is an all-solid-state type, there is no risk of liquid leakage, and therefore it is highly safe. However, the temperature dependence of the ionic conductivity of a polymer electrolyte is large, and the ionic conductivity at room temperature is a little bit too low (order of magnitude of $10^{-4}$ S/cm) and at a lower temperature below 0° C. it drops so much that it is also difficult to operate the battery.

On the other hand, a gel electrolyte is an electrolyte, in which a polymer is swollen by an organic electrolyte solution, and its ionic conductivity (order of magnitude $10^{-3}$ S/cm) is higher than that of a polymer electrolyte. Further, the interface resistance with an electrode is low, and a battery using a gel electrolyte is already on a stage of practical utilization or commercialization. However, by reason of use of an organic solvent, it is less safe compared to a polymer electrolyte.

While, an ionic liquid electrolyte is an electrolyte in which a lithium salt is dissolved in a molten salt with the melting point below room temperature. Although an ionic liquid electrolyte has high ionic conductivity, it has drawbacks to be overcome in electrochemical stability at a negative electrode, low temperature properties, and high cost.

As an electrolyte solution exhibiting high electrochemical stability even at a high potential, there is an electrolyte using a solvent containing fluorine and a solvent having a cyano group. For example, a fluorine-substituted carbonate ester electrolyte solution exhibits oxidation resistance as high as approx. 6 V. There is, however, a drawback of decrease in the solubility of a lithium salt in a solvent containing fluorine.

A Lewis acidic boron compound has a function of trapping an anion, and promotes dissociation of a lithium salt to enhance ionic conductivity. Further, it has been known that a boron compound has a flame retardant effect. Consequently, a boron compound has been used for a lithium salt containing boron, as well as for an electrolyte solution and for a polymer electrolyte. A boric ester, which is one of the most popular boron compounds, has been applied to an electrolyte solution, and, for example, suppression of increase in the interface resistance of an electrode by a mixture of a boric ester and an organic electrolytic system, or suppression of deterioration due to storage at a high temperature (Japanese Patent Application Laid-Open No. 2003-132946, and Japanese Patent Application Laid-Open No. 2003-317800), and enhancement of safety by suppression of flammability (Japanese Patent Application Laid-Open No. 2002-334717, and Japanese Patent Application Laid-Open No. 2008-300125), have been proposed.

DISCLOSURE OF INVENTION

Technical Problem

An object of the present invention is to provide a solvent for an electrolyte solution, an electrolyte solution, and a gel-like electrolyte, superior in oxidation resistance and flame resistance.

Solution to Problem

To attain the object, the present invention offers the following aspects.

[1] A solvent for an electrolyte solution comprising at least one boric ester represented by the following formula (I), and a boric ester represented by the following formula (II):

$$B(OR_f)_3 \quad (I)$$

$$B(OCH_2CH_2CN)_3 \quad (II)$$

wherein, in formula (I), each Rf independently represents $CH_2(CF_2)_nCF_3$ or $CH(CF_3)_2$, n is an integer from 0 to 6, and at least a part of each of —$OR_f$ and —$OCH_2CH_2CN$ included in the boric esters is transesterified.

[2] The solvent for an electrolyte solution according to claim 1, further comprising at least one selected from a boric ester expressed by the following formula (III) or a carbonate ester:

$$B(OR)_3 \quad (III)$$

wherein, in formula (III), R represents a methyl group, an ethyl group, a propyl group, an isopropyl group, a butyl group, a sec-butyl group or a tert-butyl group.

[3] An electrolyte solution in which a lithium salt is dissolved in the solvent for an electrolyte solution according to [1] or [2] above.

[4] The electrolyte solution according to [3] above, wherein the lithium salt is LiPF$_6$.

[5] A gel-like electrolyte comprising the electrolyte solution according to [3] or [4] above and a polymer.

Advantageous Effects of Invention

The present invention can provide a solvent for an electrolyte solution, an electrolyte solution, and a gel-like electrolyte, superior in oxidation resistance and flame resistance.

BEST MODE FOR CARRYING OUT THE INVENTION

The boiling point, solubility of a lithium salt, electrochemical stability, flammability, etc. of or in a boric ester are greatly modified by an alkoxy substituent. For example, a boric ester having an alkoxy substituent with fluorine exhibits flame resistance, and further high oxidation resistance owing to a decrease in the electron density of an alkoxy oxygen due to the high electron-accepting property of fluorine. The solubility of a lithium salt, however, is low, because of the presence of fluorine. Meanwhile, a boric ester having a short chain alkyl has low viscosity, but is flammable and exhibits poor solubility of a lithium salt. In other words, if a single boric ester is used as a solvent, the requirements, such as solubility of a lithium salt, ionic conductivity, flame resistance, and oxidation resistance, can be hardly satisfied all together.

The inventors studied and investigated intensively to obtain an electrolyte solution having oxidation resistance beyond 5 V and flame resistance to find a solvent for an electrolyte solution having both oxidation resistance and flame resistance by means of mixing B(OCH$_2$CH$_2$CN)$_3$ and B(OCH$_2$CF$_3$)$_3$, and after further studies and investigations discovered an electrolyte solution having superior oxidation resistance (increase in the potential) and flame resistance.

A solvent for an electrolyte solution according to the present invention includes at least one selected from boric esters expressed by the following formula (I) and the boric ester expressed by the following formula (II), wherein at least a part of —ORf and —OCH2CH2CN included in the boric esters are transesterified.

B(OR$_f$)$_3$                                  (I)

B(OCH$_2$CH$_2$CN)$_3$                     (II)

(In formula (I), each Rf independently represents CH$_2$(CF$_2$)$_n$CF$_3$ or CH(CF$_3$)$_2$, n is an integer from 0 to 6.)

The mix of the above 2 kinds of boric esters was conducted anticipating a transesterification reaction between the boric esters and a substituent exchange reaction between the boric esters and a lithium salt. Namely, since a boric ester has 3 alkoxy substituents in the molecule, if 2 or more boric esters are mixed, it is possible that a transesterification reaction among the substituents will take place. Once an ester is produced in which a single boron atom possesses different alkoxy substituents, improvement of the performance as an electrolyte solution, especially the oxidation resistance, compared to a case with single ester can be expected. Meanwhile, in the event of a simple mixture, there is no improvement of the oxidation resistance of an electrolyte, because decomposition initiates from a substance with low oxidation resistance, even if a substance with high oxidation resistance is mixed.

Further, since boron has high affinity with a fluoride ion, it is possible that a substituent exchange, or salt exchange reaction with a fluorine-substituted anion should take place. Consequently, in a sophisticatedly designed mixture system, in which improvement of the oxidation resistance can be expected by possible formation of a B—F bond and not by a simple mixing effect, a high performance electrolyte solution can be obtained.

The molar mixing ratio of at least one selected from boric esters expressed by the formula (I) and the boric ester expressed by the formula (II) (B(OR$_f$)$_3$/B(OCH$_2$CH$_2$CN)$_3$) is preferably 2/1 to 1/6, and more preferably 1/1 to 1/3 from viewpoints of the solubility of a lithium salt, increase in the potential, and the flame resistance.

By mixing B(OR$_f$)$_3$ and B(OCH$_2$CH$_2$CN)$_3$ at a predetermined ratio and stirring, a new kind of boric ester is produced by a transesterification reaction according to the following formula (A), which is thought to improve the oxidation resistance.

B(OCH$_2$CH$_2$CN)$_3$+
B(OCH$_2$CF$_3$)$_3$ $\rightleftharpoons$ B(OCH$_2$CH$_2$CN)$_n$
(OCH$_2$CF$_3$)$_{3-n}$                              (A)

A solvent for an electrolyte solution according to the present invention contains boric esters expressed respectively by the formula (I) and formula (II) as essential ingredients, and may contain additionally at least one selected from boric esters expressed by the following formula (III) and carbonate esters.

B(OR)$_3$                                     (III)

(In formula (III), R represents a methyl group, an ethyl group, a propyl group, an isopropyl group, a butyl group, a sec-butyl group or a tert-butyl group.)

By mixing at least one selected from boric esters expressed by the formula (III) and carbonate esters, it can be expected that the viscosity of an electrolyte solution decreases and the ionic conductivity increases.

Examples of the boric esters expressed by the formula (III) include B(OCH$_3$)$_3$, and B(OCH$_2$CH$_3$)$_3$. By adding B(OR)$_3$ expressed by the formula (III) in addition to boric esters expressed respectively by the formula (I) and the formula (II), a transesterification reaction should occur among the 3 kinds of boric esters.

Meanwhile, a carbonate ester (organic solvent) may be selected, for example, from ethylene carbonate (EC), propylene carbonate (PC), diethyl carbonate (DEC), dimethyl carbonate (DMC), ethyl methyl carbonate (EMC), γ-butyrolactone (GBL) and a mixed solvent therefrom.

If at least one selected from boric esters expressed by the formula (III) and carbonate esters is also mixed, the content is preferably 0.5 to 5 mol with respect to total 1 mol of $B(OR_f)_3$ and $B(OCH_2CH_2CN)_3$ and more preferably 1 to 2 mol, from viewpoints of maintaining the oxidation resistance and flame resistance by the two essential boric esters, and enhancing the conductivity.

For an electrolyte solution according to the present invention a lithium salt is dissolved preferably in a mixed solvent of boric esters expressed respectively by the formula (I) and the formula (II). Examples of a lithium salt include $LiPF_6$, $LiBF_4$, $Li(CF_3SO_2)_2N$ (lithium bistrifluoromethanesulfonylimide, occasionally written as "TFSI"), and $LiCF_3SO_3$, and from a viewpoint of increasing the potential (oxidation resistance) especially LiPF6 is preferable.

The concentration of a lithium salt in an electrolyte solution according to the present invention is preferably 0.5 mol/kg to 1.5 mol/kg from a viewpoint of the ionic conductivity.

An electrolyte solution according to the present invention may be used as it is, or may be also used as a gel-like electrolyte containing the electrolyte solution according to the present invention and a polymer. As a polymer, for example, any one selected from polyethylene oxide (PEO), an ethylene oxide-propylene oxide copolymer (EO-PO), poly(methoxyoligoethylene glycoxy)methacrylate, polymethyl methacrylate (PMMA), polyethyl methacrylate, polyacrylonitrile, polyvinylidene fluoride (PVDF), and a vinylidene fluoride-hexafluoropropylene copolymer (PVDF-HFP) may be used.

By preparing, from a polymer, a gel-like electrolyte that is swollen with an electrolyte solution according to the present invention, an electrolyte having higher ionic conductivity, lower interface resistance with respect to an electrode, and, moreover, higher safety in terms of flame resistance as compared to a conventional polymer electrolyte, can be obtained.

The content ratio (by mass) of an electrolyte solution to a polymer is, for example, 2/1 to 4/1, subject to the kind of a polymer.

EXAMPLES

Examples and Experimental Example with respect to the present invention will be described below, provided that the present invention be not limited to such Examples and Experimental Example.

Example 1

According to the following procedures boric esters 1 to 4 and electrolyte solutions were synthesized or prepared, and mixed solvents and electrolyte solutions were also prepared and measured using the boric esters in Examples and Experimental Example. The boric esters may be occasionally referred to simply as numbers (1, 2, 3 and 4) in the drawings.

Boric ester 1: $B(OCH_3)_3$
Boric ester 2: $B(OCH_2CH_3)_3$
Boric ester 3: $B(OCH_2CH_2CN)_3$
Boric ester 4: $B(OCH_2CF_3)_3$ Preparation of Boric Esters 1 and 2

As boric ester 1 ($B(OCH_3)_3$, trimethyl borate) and boric ester 2 ($B(OCH_2CH_3)_3$, triethyl borate), respective commercial products (manufactured by Tokyo Chemical Industry Co., Ltd.) were purified by distillation and used.

Synthesis of Boric Ester 3

20 mL of toluene, 4.953 g (0.080 mol) of boric acid, and 17.954 g (0.253 mol) of 3-hydroxypropionitrile were added into a 50 mL 2-neck flask connected with a Dean Stark tube, which was then heated and stirred for reflux of toluene for 3 hours. Water produced by the reaction was removed from the reaction system by azeotropic distillation with toluene. After the completion of the reaction, toluene was distilled away and the crude product was purified by vacuum distillation to obtain colorless, transparent tricyanoethyl borate: $B(OCH_2CH_2CN)_3$ (boric ester 3) (b.p. 198° C./0.3 mmHg, yield: 83.8%).

1H-NMR (CDCl$_3$): 4.20 ppm (t: OCH$_2$CH$_2$CN), 2.65 ppm (t: OCH$_2$CH$_2$CN)

Synthesis of Boric Ester 4

18.768 g (0.1817 mol) of trifluoroethanol was added to a 50 mL 2-neck flask that had been purged by nitrogen, into which 61.018 g (0.067 mol) of a BH$_3$ THF (tetrahydrofuran) solution was then dropped while cooling in a water bath. After the completion of the reaction, THF was distilled away and the crude product was purified by vacuum distillation to obtain a colorless, transparent boric ester: $B(OCH_2CF_3)_3$ (boric ester 4) (b.p. 86° C./347.3 mmHg, yield: 51.1%).

1H-NMR (CDCl$_3$): 4.20 ppm (q: OCH$_2$CF$_3$)

Preparation of Double-Mixed Boric Ester Electrolyte Solution

In a glove box under an argon atmosphere, $B(OCH_2CH_2CN)_3$ (boric ester 3), $B(OCH_2CF_3)_3$ (boric ester 4) and a battery grade $LiPF_6$ or $Li(CF_3SO_2)_2N$ (TFSI) were weighed, and mixed and stirred in a flask to obtain a mixed boric ester electrolyte solution.

Example 2

Figure 1:
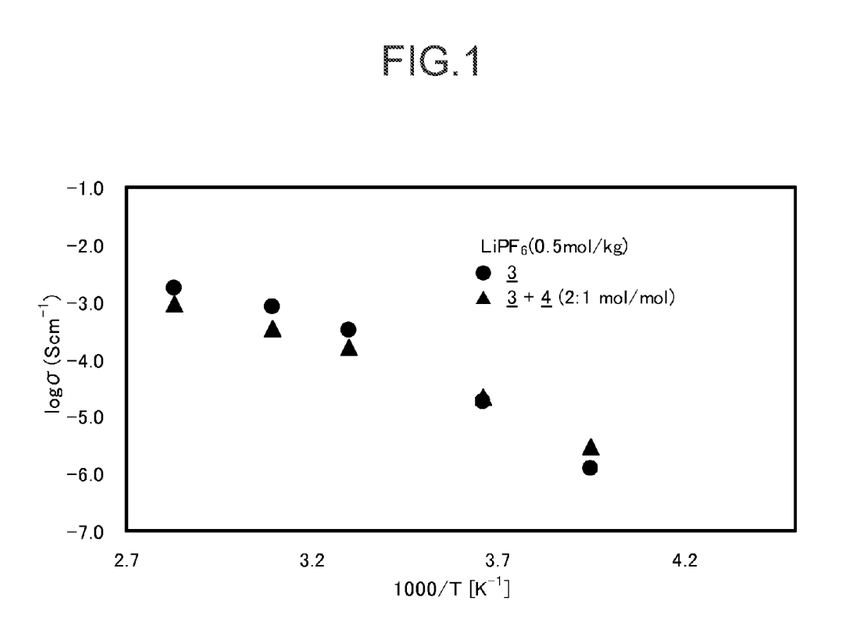
FIG. 1 is a graph showing the ionic conductivity of an electrolyte solution in which LiPF$_6$ is dissolved in a 1-component boric ester or a double-mixed boric ester solvent.

Measurement of Ionic Conductivity of Double-Mixed Boric Ester Electrolyte Solution The ionic conductivity of a double-mixed boric ester out of $B(OCH_2CH_2CN)_3$ (boric ester 3) and $B(OCH_2CF_3)_3$ (boric ester 4) was measured by an AC impedance method. As a measurement cell, a hermetically sealed electrode cell (manufactured by Toyo System Co. Ltd.) was used. The ionic conductivity of an electrolyte solution in which $LiPF_6$ is dissolved in a mixed solvent of the two boric esters ($B(OCH_2CH_2CN)_3/B(OCH_2CF_3)_3=2/1$ (by mol)) and the ionic conductivity of an electrolyte solution in which $LiPF_6$ is dissolved in $B(OCH_2CH_2CN)_3$ are shown in FIG. 1.

Although $B(OCH_2CH_2CN)_3$ (boric ester 3) dissolved the lithium salt owing to its polar CN group, the viscosity was high with a single solvent, and the ionic conductivity was slightly low. While $B(OCH_2CF_3)_3$ (boric ester 4), which has low viscosity, does not dissolve a lithium salt, with a mixture with $B(OCH_2CH_2CN)_3$ the ionic conductivity was similar to that of $B(OCH_2CH_2CN)_3$.

In general the ionic conductivity of an electrolyte solution depends on the concentration of an ion species and the diffusion velocity of an ion, and the diffusion velocity decreases in step with increase in the viscosity of a solution. If trimethyl borate (boric ester 1) or triethyl borate (boric ester 2) with low viscosity is mixed with B(OCH$_2$CH$_2$CN)$_3$, the ionic conductivity increases but the flame retardant effect is inferior as described below.

Example 3

Evaluation of Electrochemical Stability of Double-Mixed Boric Ester

Figure 2:
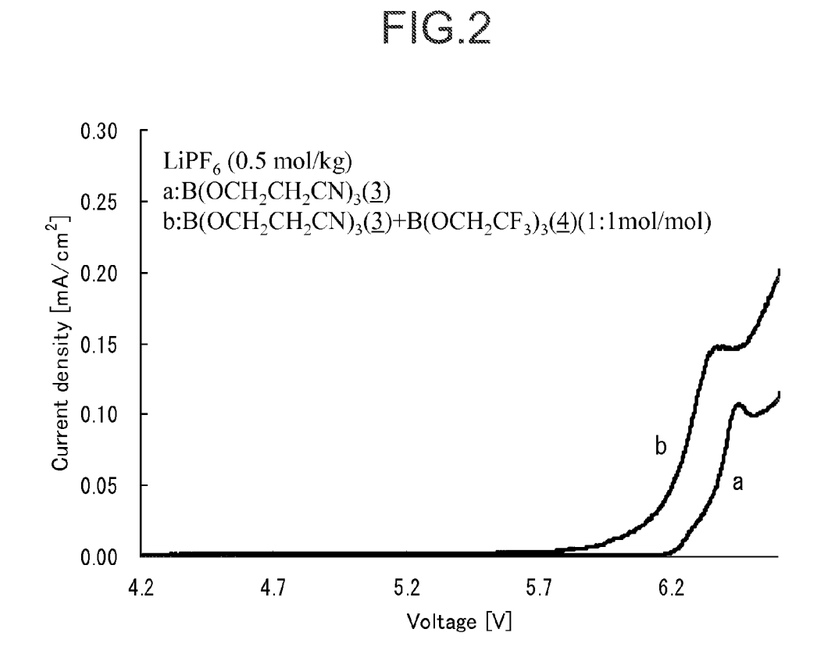
FIG. 2 is a graph showing the LSV measurement result on an electrolyte solution in which LiPF$_6$ is dissolved in a 1-component boric ester or a double-mixed boric ester solvent.

The electrochemical stability of a mixed electrolyte solution with a double-mixed boric ester out of B(OCH$_2$CH$_2$CN)$_3$ (boric ester 3) and B(OCH$_2$CH$_2$CN)$_3$ (boric ester 4) was measured by LSV (Linear Sweep Voltammetry) (sweeping speed 0.1 mV/s). The electrolyte solution was impregnated in methylcellulose; platinum was used for a working electrode and a lithium metal was used for a reference electrode and a counter electrode. The result of the LSV measurement is shown in FIG. 2.

The oxidation resistance of B(OCH$_2$CH$_2$CN)$_3$ (boric ester 3) became high owing to the electron-accepting property of a cyano group. Even if B(OCH$_2$CF$_3$)$_3$ (boric ester 4) is added, the oxidation potential is 5.5 V or higher, and the solution has the oxidation resistance corresponding to a 5 V class high-potential battery.

Example 4

Confirmation of Transesterification in Double-Mixed Boric Ester

Figure 3:
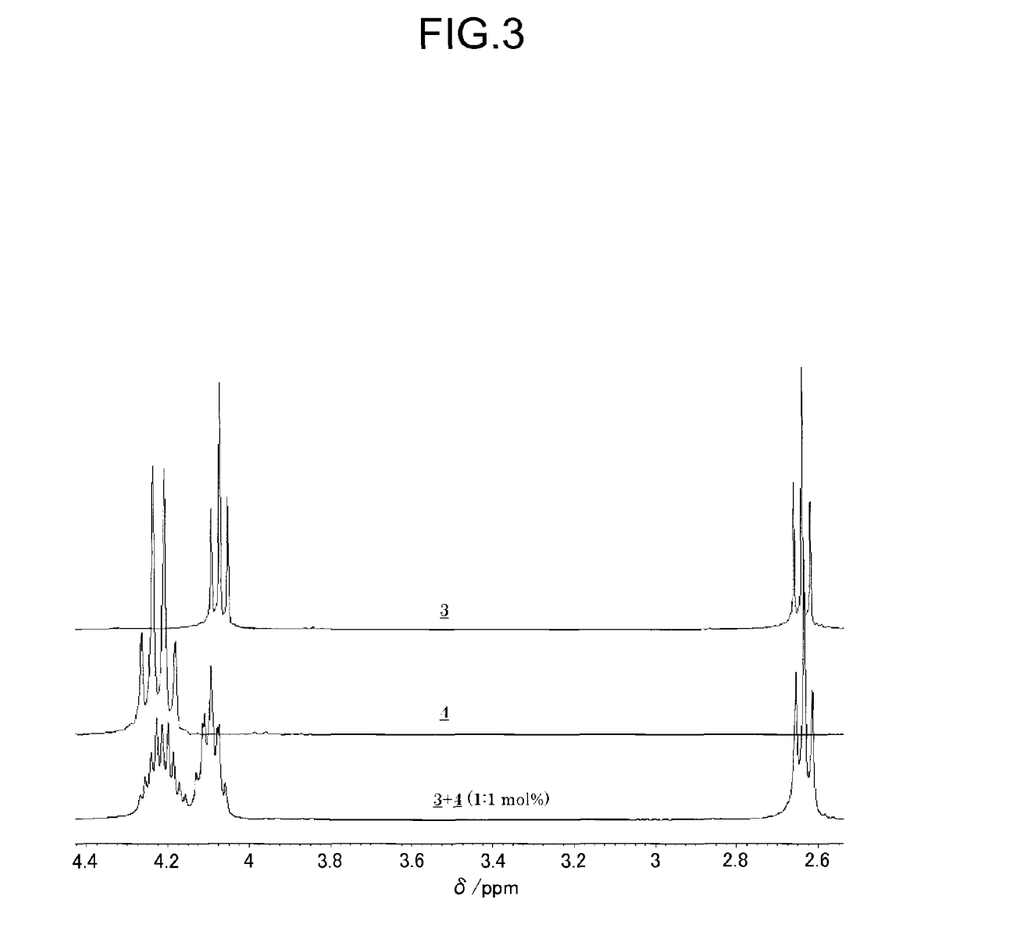
FIG. 3 is a graph showing the NMR spectra obtained by a measurement of the equimolar mixture of B(OCH$_2$CH$_2$CN)$_3$ (boric ester 3) and B(OCH$_2$CF$_3$)$_3$ (boric ester 4).

If two boric esters are simply mixed, oxidation decomposition of a boric ester which has lower oxidation resistance of the two boric esters should occur at a low potential. Improvement of properties such as oxidation resistance by mixing is hypothetically attributable to occurrence of a transesterification reaction according to the following formula (A), and the phenomenon has been investigated by NMR spectrometry. Two kinds of boric esters, namely B(OCH$_2$CH$_2$CN)$_3$ (boric ester 3) and B(OCH$_2$CF$_3$)$_3$ (boric ester 4) were mixed in an equimolar amount, and dissolved in a CDCl$_3$ solvent, which was measured by NMR spectroscopy. The result is shown in FIG. 3.

In the mixed solvent (molar ratio 1/1) of B(OCH$_2$CH$_2$CN)$_3$ and B(OCH$_2$CF$_3$)$_3$, the signal around 4.06 ppm assignable to a methylene proton of B(OCH$_2$CH$_2$CN)$_3$ (boric ester 3) and the signal around 4.22 ppm assignable to a methylene proton of B(OCH$_2$CF$_3$)$_3$ (boric ester 4) were observed respectively as mixtures of multiple signals. According to the above it was confirmed that a new kind of boric ester was produced, namely the transesterification reaction according to the following formula (A) occurred.

(A)

Experimental Example 5

Confirmation of Substituent Exchange Reaction

The oxidation resistance depends on a lithium salt, and the case with LiPF$_6$ gave the highest value. This is thought to have been caused by a fluorine-substituted group introduced partly to the boron due to a substituent exchange reaction. The exchange reaction was confirmed by the NMR spectra shown in FIG. 4. For this purpose, B(OCH$_3$)$_3$ giving a singlet signal, which is easy to analyze, was used as a boric ester, and measurements were conducted at various molar ratios. When LiPF$_6$ was added to B(OCH$_3$)$_3$, doublet signals from a P—OCH$_3$ bond of LiP(OCH$_3$)$_k$F$_{6-k}$ around 3.68 ppm and P(OCH$_3$)$_l$F$_{6-l}$ around 3.87 ppm appeared, and the intensities of the same increased in step with the increase of the ratio of LiPF$_6$ to support the occurrence of a substituent exchange reaction and a salt exchange reaction from a part of phosphate to a borate according to the following Formula (B).

Figure 4:
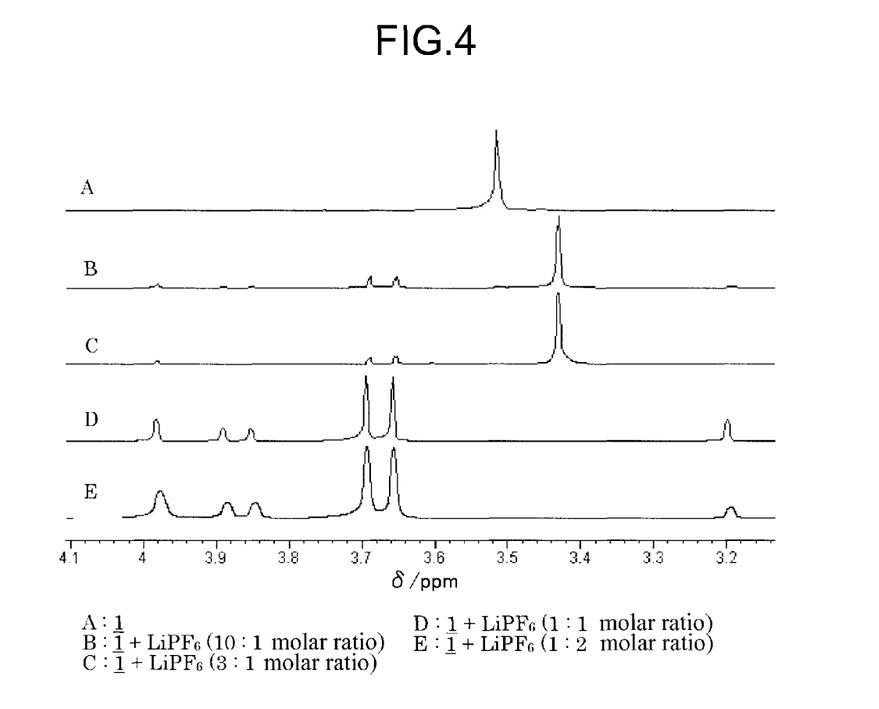
FIG. 4 is a graph showing NMR spectra demonstrating that a substituent exchange reaction takes place in the event that B(OCH$_3$)$_3$ (boric ester 1) and LiPF$_6$ are used.

(B)

Example 6

Measurement of Ionic Conductivity of Triple-Mixed Boric Ester Electrolyte Solution The ionic conductivity of a mixed electrolyte solution with a triple-mixed boric ester out of B(OCH$_2$CF$_3$)$_3$, B(OCH$_2$CH$_2$CN)$_3$ and B(OCH$_3$)$_3$ or B(OCH$_2$CH$_3$)$_3$ was measured by a similar method as in Example 2.

Figure 5:
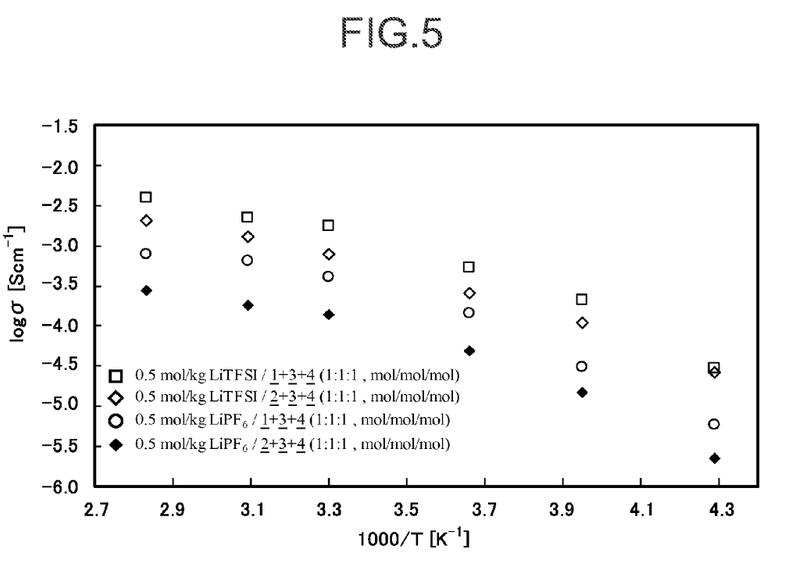
FIG. 5 is a graph showing the ionic conductivities of a triple-mixed boric ester electrolyte solution.

Since with respect to B(OCH$_2$CF$_3$)$_3$ or a mixed solvent of B(OCH$_2$CF$_3$)$_3$ and B(OCH$_2$CH$_2$CN)$_3$, the viscosity was high and the ionic conductivity was slightly low, trimethyl borate (boric ester 1) or triethyl borate (boric ester 2), which decrease the viscosity, tricyanoethyl borate (boric ester 3), which has a promoting effect for dissolution and dissociation of a supporting salt, and B(OCH$_2$CF$_3$)$_3$ (boric ester 4), which has a flame retardant effect, were mixed at a molar ratio of 1/1/1, and a 0.5 M concentration electrolyte solution of LiPF$_6$ or TFSI was prepared therewith. The ionic conductivities of the prepared electrolyte solutions are shown in FIG. 5.

If the composition was optimized, a boric ester electrolyte solution exhibited a value on an order of magnitude of $10^{-3}$ Scm-1 at room temperature. The ionic conductivity of an electrolyte solution was higher with trimethyl borate than with triethyl borate.

Example 7

Evaluation of Electrochemical Stability of Triple-Mixed Boric Ester Electrolyte Solution 1

Figure 6:
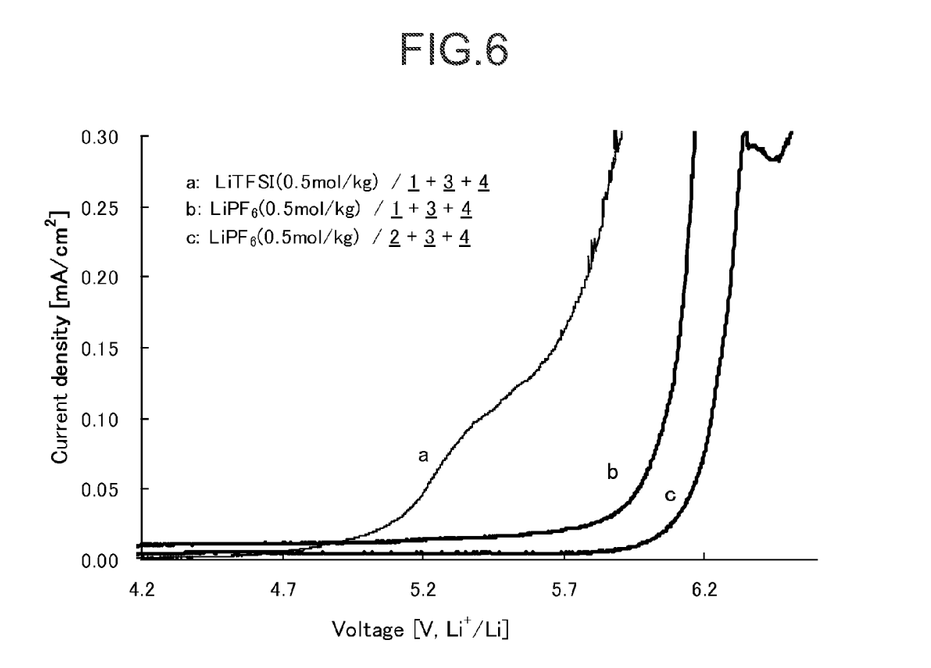
FIG. 6 is a graph showing the LSV measurement results of a triple-mixed boric ester electrolyte solutions.

Evaluation of the electrochemical stability of a mixed electrolyte solution with a triple-mixed boric ester out of B(OCH$_2$CF$_3$)$_3$, B(OCH$_2$CH$_2$CN)$_3$, and B(OCH$_3$)$_3$ or B(OCH$_2$CH$_3$)$_3$ was conducted similarly as in Example 3 by an LSV measurement, and the measurement result is shown in FIG. 6.

An electrolyte solution using LiPF$_6$ as a supporting salt (b and c in FIG. 6) showed the oxidation decomposition potential of approx. 6 V exhibiting oxidation resistance applicable to a 5 V class battery. Meanwhile, with respect to an electrolyte solution using LiTFSI (a in FIG. 6), although the oxidation resistance was lower than the case using LiPF$_6$, the decomposition potential still reached approx. 5 V. With respect to both the supporting salts, an electrolyte solution using triethyl borate (boric ester 2) had a higher oxidation decomposition potential than an electrolyte solution using trimethyl borate (boric ester 1).

Example 8

Confirmation of Transesterification in Triple-Mixed Boric Ester Solvent

Figure 7:
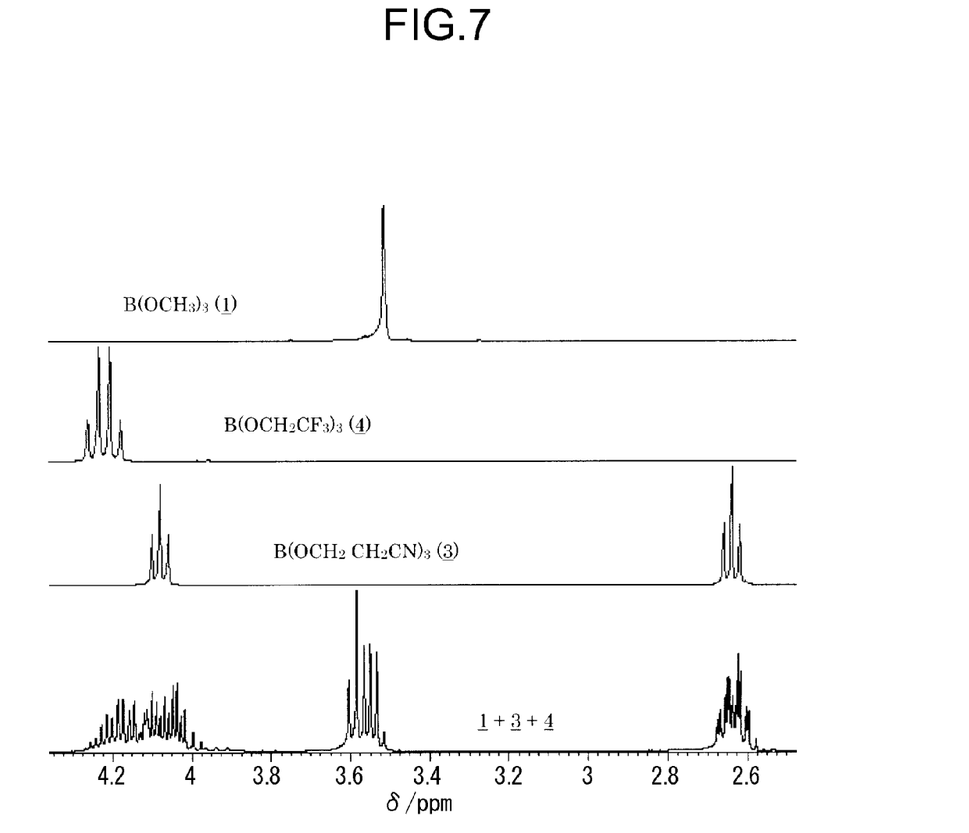
FIG. 7 is a graph showing the NMR spectra obtained by a measurement of the equimolar mixture of B(OCH$_3$)3(boric ester 1), B(OCH$_2$CH$_2$CN)$_3$ (boric ester 3) and B(OCH$_2$CF$_3$)$_3$ (boric ester 4).

In order to confirm transesterification among boric esters also in a 3-component system, 3 kinds of boric esters, (B(OCH$_3$), B(OCH$_2$CF$_3$)$_3$, and B(OCH$_2$CH$_2$CN)$_3$), were mixed in the equimolar ratio and dissolved in a CDCl$_3$ solvent, and NMR spectroscopic measurements were carried out. The result is shown in FIG. 7. As seen in FIG. 7, a singlet signal of the CH$_3$O group was divided into six by mixing. In contrast to a mixture system of 2 kinds of boric esters, where there was a triplet signal, it was demonstrated that boric esters with 6 kinds of CH$_3$O groups were produced confirming occurrence of a transesterification reaction.

Example 9

Burning Test

The flammability of a boric ester electrolyte solution was evaluated by impregnating an electrolyte solution into a glass filter, heating with a test flame placed 3 cm beneath, and measuring the time to ignition. The result is shown in Table 1

TABLE 1

| Electrolyte solution(1 mol/kgLiPF$_6$ solution) | Time to ignition(s) |
|---|---|
| B(OCH$_2$CH$_2$CN)$_3$ | 10 |
| B(OCH$_2$CH$_2$CN)$_3$ + B(OCH$_2$CF$_3$)$_3$ | Not ignited. |
| EMC | <3 |
| B(OCH$_2$CH$_2$CN)$_3$ + EC-EMC (1/1) (1:1 Volume ratio) | 5 |
| B(OCH$_2$CH$_2$CN)$_3$+B(OCH$_2$CF$_3$)$_3$ (1:1 molar ratio) + EC-EMC (1/1) (1:1 Volume ratio) | Not ignited. |

The result of the burning test was that an electrolyte solution using the boric ester B(OCH$_2$CH$_2$CN)$_3$ did burn, although it was difficult to ignite. Meanwhile, a mixed boric ester electrolyte solution of B(OCH$_2$CH$_2$CN)$_3$+B(OCH$_2$CF$_3$)$_3$ was not ignited. While an electrolyte solution using ethyl methyl carbonate (EMC) as a carbonate ester solvent was ignited right after the initiation of the test, with respect to a mixed system with the boric ester B(OCH$_2$CH$_2$CN)$_3$ the time to ignition was delayed.

Meanwhile, with respect to a system, in which a carbonate ester was mixed with a mixed boric ester solvent of B(OCH$_2$CH$_2$CN)$_3$ and B(OCH$_2$CF$_3$)$_3$, it started issuing white smoke after ten-odd seconds from the initiation of the test, but ignition did not occur even after 30 seconds or more. Namely, the electrolyte solution was confirmed to be highly safe. While, trimethyl borate and triethyl borate are flammable, and if the burning test was actually conducted, they were ignited within a few seconds, but if B(OCH$_2$CH$_2$CN)$_3$ and B(OCH$_2$CF$_3$)$_3$ were mixed the ignition was inhibited.

Example 10

With a mixture of B(OCH$_2$CH$_2$CN)$_3$ (boric ester 3) and B(OCH$_2$CF$_3$)$_3$ (boric ester 4) at a molar ratio of 1/1, the same volume of ethyl methyl carbonate (EMC) was mixed to obtain a mixed solvent. An electrolyte solution was prepared by dissolving LiPF$_6$ in the mixed solvent to be a concentration of 1 mol/kg, and the ionic conductivity and LSV thereof were measured by similar methods as in Example 2. The measurement result of ionic conductivity is shown in FIG. 8, and the measurement result of LSV is shown in FIG. 9 respectively.

Figure 8:
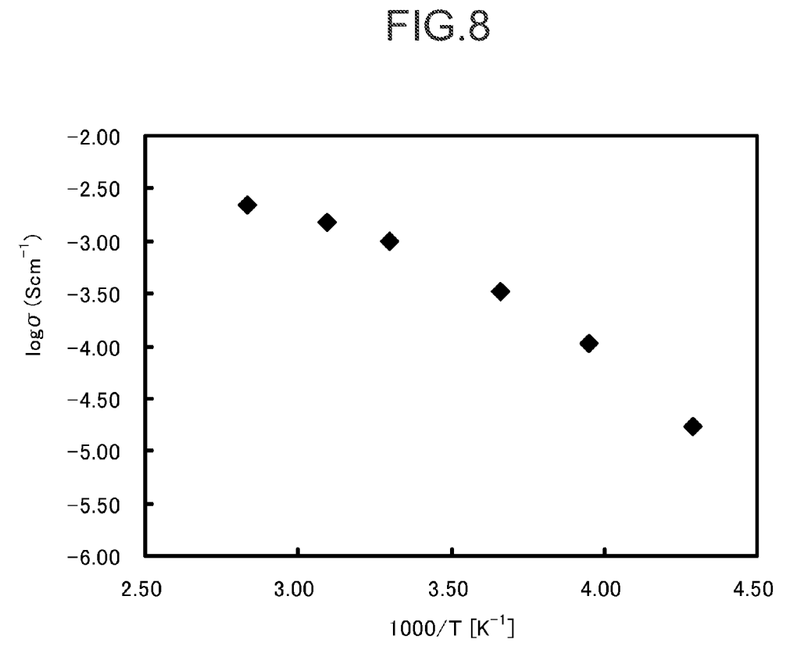
FIG. 8 is a graph showing the ionic conductivity of the mixed electrolyte solution of LiPF$_6$ (1 mol/Kg)/[B(OCH$_2$CH$_2$CN)$_3$/B(OCH$_2$CF$_3$)$_3$ (1/1 by mol)/EMC].
Figure 9:
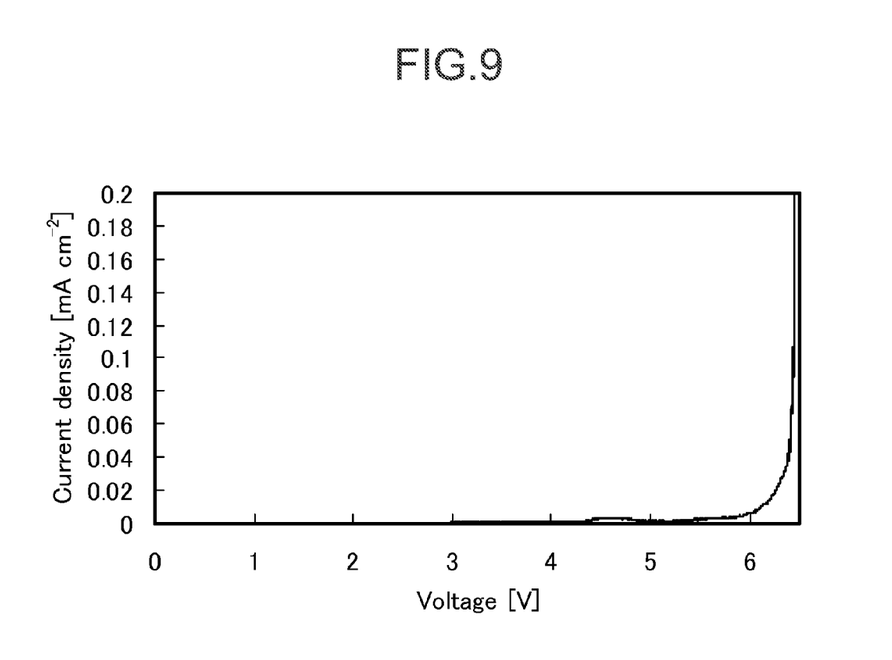
FIG. 9 is a graph showing an LSV measurement result of the mixed electrolyte solution of LiPF$_6$ (1 mol/Kg)/[B(OCH$_2$CH$_2$CN)$_3$/B(OCH$_2$CF$_3$)$_3$ (1/1 by mol)/EMC].

As seen in FIG. 8, if an EMC solvent was added, the ionic conductivity increased compared to a mixed electrolyte solution of the boric ester 3 and the boric ester 4 (see Example 2, and FIG. 1) owing to the viscosity lowering effect. As seen in FIG. 9, even if a carbonate ester with low oxidation resistance was mixed, it remained stable up to 6 V or higher. The probable reasoning behind the above is that a boric ester, of which Lewis acidity was intensified by fluorine exchange, interacted with a carbonate ester to enhance the oxidation resistance.

A similar effect can be obtained by a mixed electrolyte solution of a double mixed ester and a carbonate ester.

Example 11

Evaluation of Electrochemical Stability of Triple-Mixed Boric Ester Electrolyte Solution 2

Using the following solvents a to d, and LiPF$_6$ (1 mol/kg) as an Li salt LSV measurements were conducted similarly as in Example 3.

(a) A mixed solvent (1/1) of B(OCH$_2$CF$_3$)$_3$ and a carbonate ester (EC/EMC=1/1);
(b) A carbonate ester only (EC/EMC=1/1);
(c) A mixed solvent (1/1) of B(OCH$_2$CH$_2$CN)$_3$ and a carbonate ester (EC/EMC=1/1); and
(d) A mixed boric ester solvent of B(OCH$_2$CH$_2$CN)$_3$, B(OCH$_3$)$_3$ and B(OCH$_2$CF$_3$)$_3$.

Figure 10:
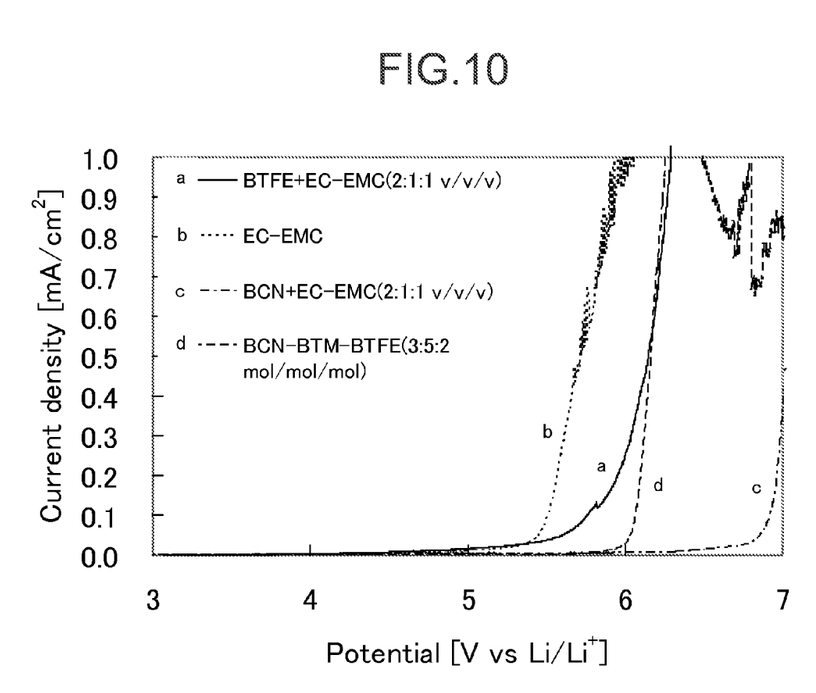
FIG. 10 is a graph showing LSV measurement results of various ester electrolyte solutions.

The measurement result is shown in Table 10, wherein BTFE stands for B(OCH$_2$CF$_3$)$_3$, BCN for B(OCH$_2$CH$_2$CN)$_3$, and BTM for B(OCH$_3$)$_3$, respectively.

As seen in FIG. 10, in case b, in which only a carbonate ester was used as a solvent, decomposition started around 4.5 V. In case a, in which a mixed ester of a fluorinated boric ester (BTFE) and a carbonate ester was used, the oxidation resistance is slightly higher than case b, but its decomposition starts below 5 V, and it is not applicable to a 5 V-class battery. In case c, in which a mixed ester of BCN and a carbonate ester are used, its decomposition starts around 6 V, and the oxidation resistance is the highest, but it is flammable as shown in the Table 1 and has poorer safety.

Meanwhile, in case d, in which a mixed boric ester solvent out of BCN, BTM, and BTFE is used, it has high oxidation resistance with the oxidation stability of 5.5 V or higher, and is flame resistant as shown in the Table 1 exhibiting superior safety.

The invention claimed is:

1. A solvent for an electrolyte solution comprising at least one boric ester represented by the following formula (I), and a boric ester represented by the following formula (II):

B(OR$_f$)$_3$ (I)

B(OCH$_2$CH$_2$CN)$_3$ (II)

wherein, in formula (I), each R$_f$ independently represents CH$_2$(CF$_2$)$_n$CF$_3$ or CH(CF$_3$)$_2$, n is an integer from 0 to 6, and at least a part of each of —OR$_f$ and —OCH$_2$CH$_2$CN included in the boric esters is transesterified.

2. The solvent for an electrolyte solution according to claim 1, further comprising at least one selected from a boric ester expressed by the following formula (Ill) or a carbonate ester:

B(OR)$_3$ (III)

wherein, in formula (III), R represents a methyl group, an ethyl group, a propyl group, an isopropyl group, a butyl group, a sec-butyl group, or a tert-butyl group.

3. An electrolyte solution, wherein a lithium salt is dissolved in the solvent for an electrolyte solution according to claim 1.

4. An electrolyte solution, wherein a lithium salt is dissolved in the solvent for an electrolyte solution according to claim 2.

5. The electrolyte solution according to claim 3, wherein the lithium salt is LiPF$_6$.

6. The electrolyte solution according to claim 4, wherein the lithium salt is $LiPF_6$.

7. A gel-like electrolyte comprising the electrolyte solution according to claim 3 and a polymer.

8. A gel-like electrolyte comprising the electrolyte solution according to claim 4 and a polymer.

9. A gel-like electrolyte comprising the electrolyte solution according to claim 5 and a polymer.

10. A gel-like electrolyte comprising the electrolyte solution according to claim 6 and a polymer.

11. The electrolyte solution according to claim 3, wherein the lithium salt is $LiBF_4$.

12. The electrolyte solution according to claim 4, wherein the lithium salt is $LiBF_4$.

13. A gel-like electrolyte comprising the electrolyte solution according to claim 11 and a polymer.

14. A gel-like electrolyte comprising the electrolyte solution according to claim 12 and a polymer.

\* \* \* \* \*

UNITED STATES PATENT AND TRADEMARK OFFICE
CERTIFICATE OF CORRECTION

PATENT NO. : 8,822,086 B2
APPLICATION NO. : 13/498422
DATED : September 2, 2014
INVENTOR(S) : Tatsuo Fujinami et al.

It is certified that error appears in the above-identified patent and that said Letters Patent is hereby corrected as shown below:

On the Title Page:

Item 57, line 9, "-ORf" should be -- -OR$_f$ --.

In the Claims:

At Column 10, line 53, "(Ill)" should be -- (III) --.

Signed and Sealed this
Seventeenth Day of November, 2015

Michelle K. Lee
*Director of the United States Patent and Trademark Office*